Figure 1:
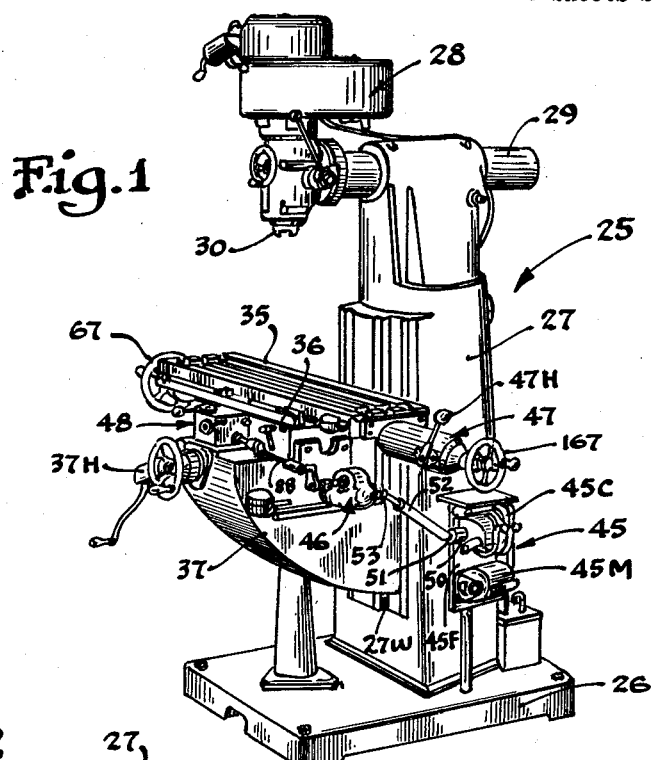

March 12, 1963

R. E. FRUSHOUR ETAL 3,080,766

MACHINE TOOLS

Filed Aug. 26, 1958

5 Sheets-Sheet 1

Inventors
Russel E. Frushour
Otto A. Costello
Stephen E. Farekas
Wayne B. Irish

By Mann, Brown & McWilliams
Attorneys

March 12, 1963  R. E. FRUSHOUR ET AL  3,080,766
MACHINE TOOLS
Filed Aug. 26, 1958  5 Sheets-Sheet 2

Inventors
Russel E. Frushour
Otto A. Costello
Stephen E. Farekas
Wayne B. Irish
By Mann, Brown & McWilliams
Attorneys

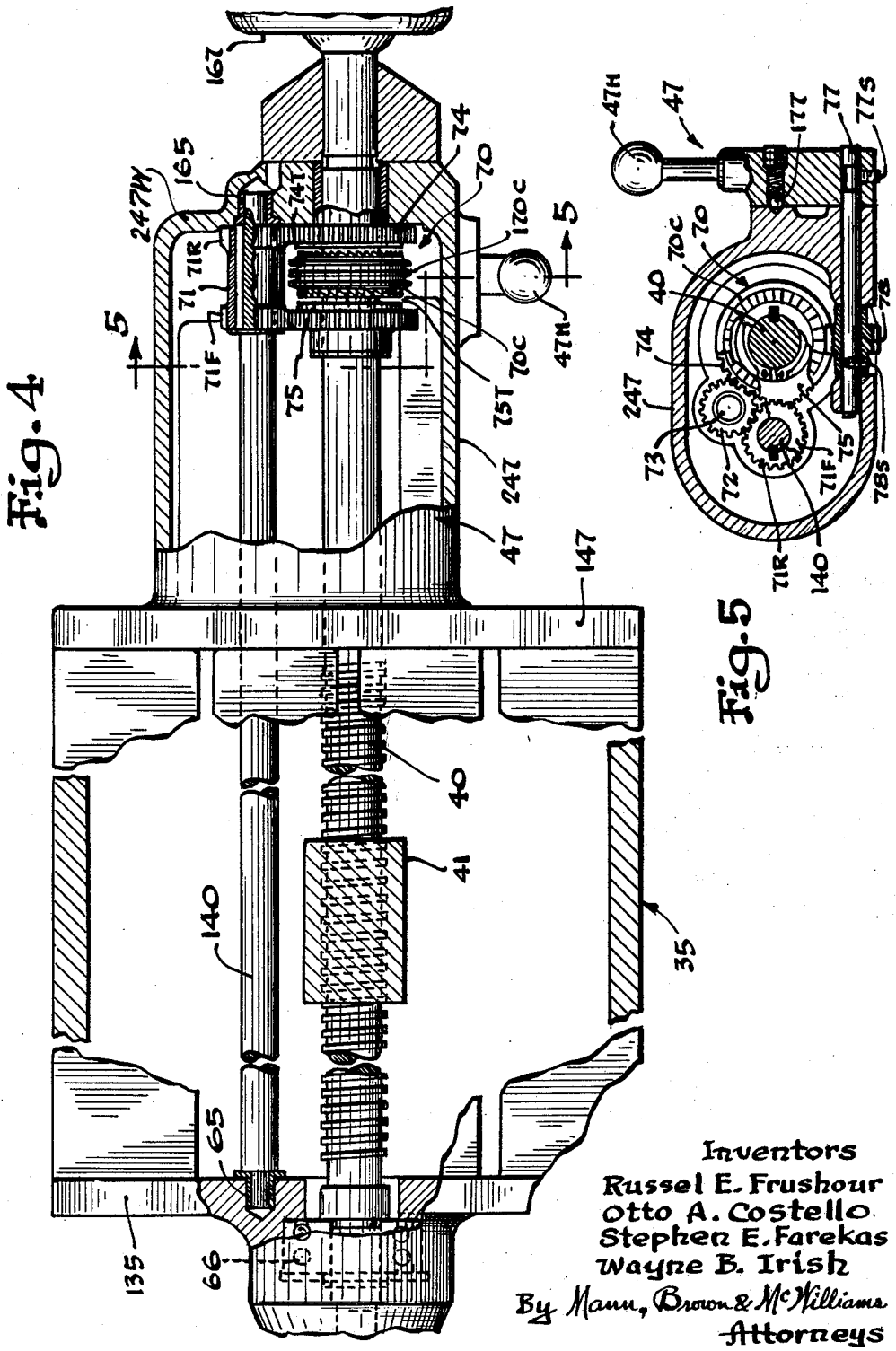

March 12, 1963  R. E. FRUSHOUR ET AL  3,080,766
MACHINE TOOLS
Filed Aug. 26, 1958  5 Sheets-Sheet 4
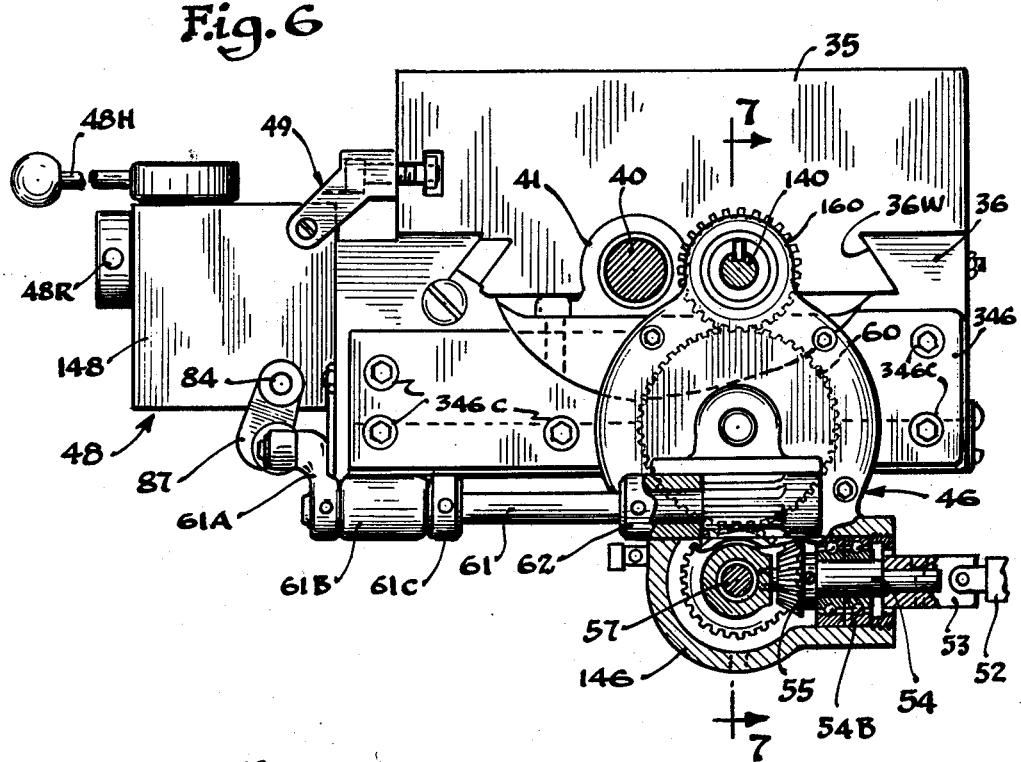
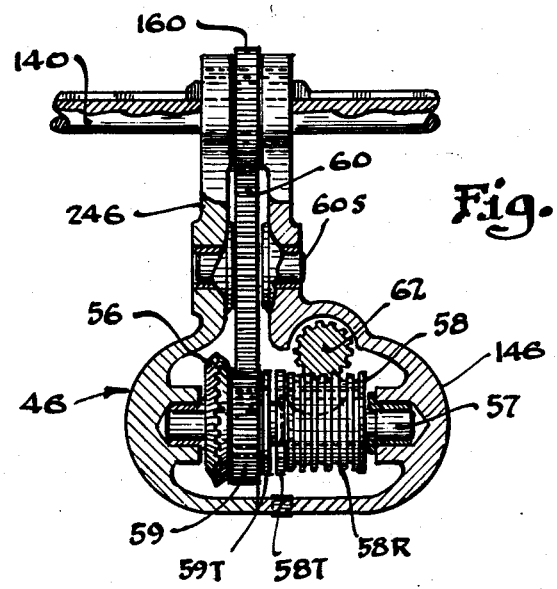
Inventors
Russel E. Frushour
Otto A. Costello
Stephen E. Farekas
Wayne B. Irish
By Mann, Brown & McWilliams
Attorneys March 12, 1963  R. E. FRUSHOUR ET AL  3,080,766
MACHINE TOOLS
Filed Aug. 26, 1958  5 Sheets-Sheet 5
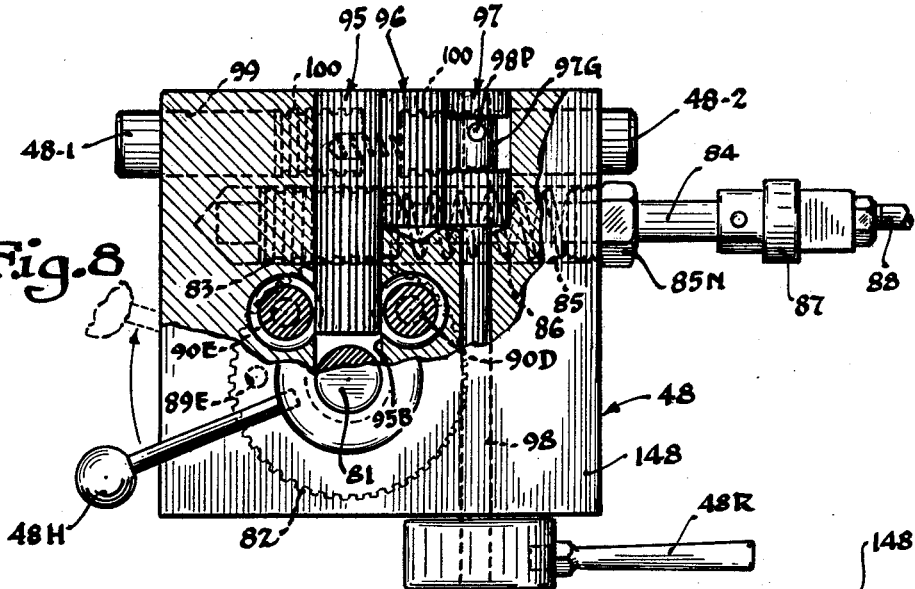
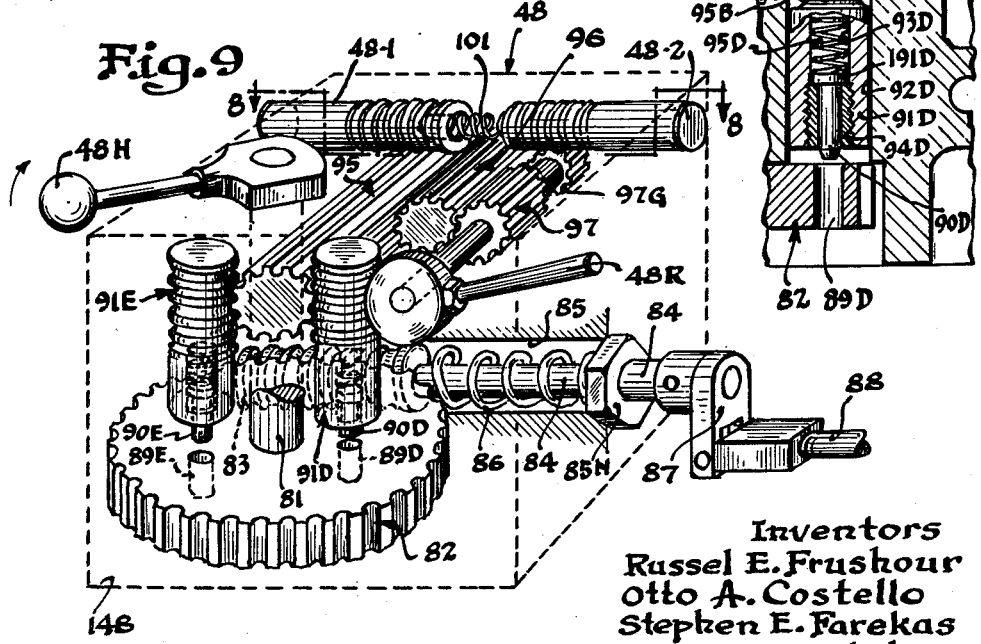
Inventors
Russel E. Frushour
Otto A. Costello
Stephen E. Farekas
Wayne B. Irish
By Mann, Brown & McWilliams
Attorneys

United States Patent Office 3,080,766
Patented Mar. 12, 1963

3,080,766
MACHINE TOOLS
Russel E. Frushour, Niles, Mich., and Otto A. Costello, Stephen E. Farekas, and Wayne B. Irish, South Bend, Ind., assignors, by mesne assignments, to Amsted Industries Incorporated, Chicago, Ill., a corporation of New Jersey
Filed Aug. 26, 1958, Ser. No. 757,371
13 Claims. (Cl. 74—333)

This invention relates to machine tools and particularly to mechanical power drives for the table thereof.

In machine tools the work-holding table is usually mounted for longitudinal reciprocation so that the table may be either set in a particular position or moved back and forth in the course of a work-performing operation. Machine tools of the aforesaid character are of two general types insofar as the operation of the table may be concerned, the machine tools in smaller sizes being provided in most instances with manually operable means for reciprocating the table, while in larger machine tools intended for automatic heavy duty operation, power means is usually provided for reciprocating the table. The power means may take the form of a hydraulic actuator or may be of a mechanical character, and it is to mechanical power drive for machine tool tables that the present invention is directed.

The prior mechanical power drive for machine tool tables have, in most instances, been fairly elaborate both in their mechanical structure and in the control thereof, and it is the primary object of the present invention to enable such a mechanical drive for a machine tool table to be relatively simple in character while at the same time achieving efficient table actuation and being capable of conventional control. More specifically, it is an object of the present invention to provide a mechanical power drive for machine tool tables where the various components of the drive are so distributed or located that efficient operation is attained and undue concentration of eccentric weight on the table is avoided.

Other and related objects of the invention are to provide a mechanical power drive for machine tool tables that is adapted particularly for smaller sizes of machine tools and which is adapted for incorporation in such machine tools in a way that preserve substantially the same normal manner of manual actuation while enabling the table to be mechanically driven when this is desired.

A related object of the invention is to provide such a mechanical power drive that may be effectively and conveniently controlled either manually or by table dowels, and which may also be controlled by safety stop mechanisms to disconnect the drive when the table has reached one or the other of the two limits of travel.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

Figure 2:
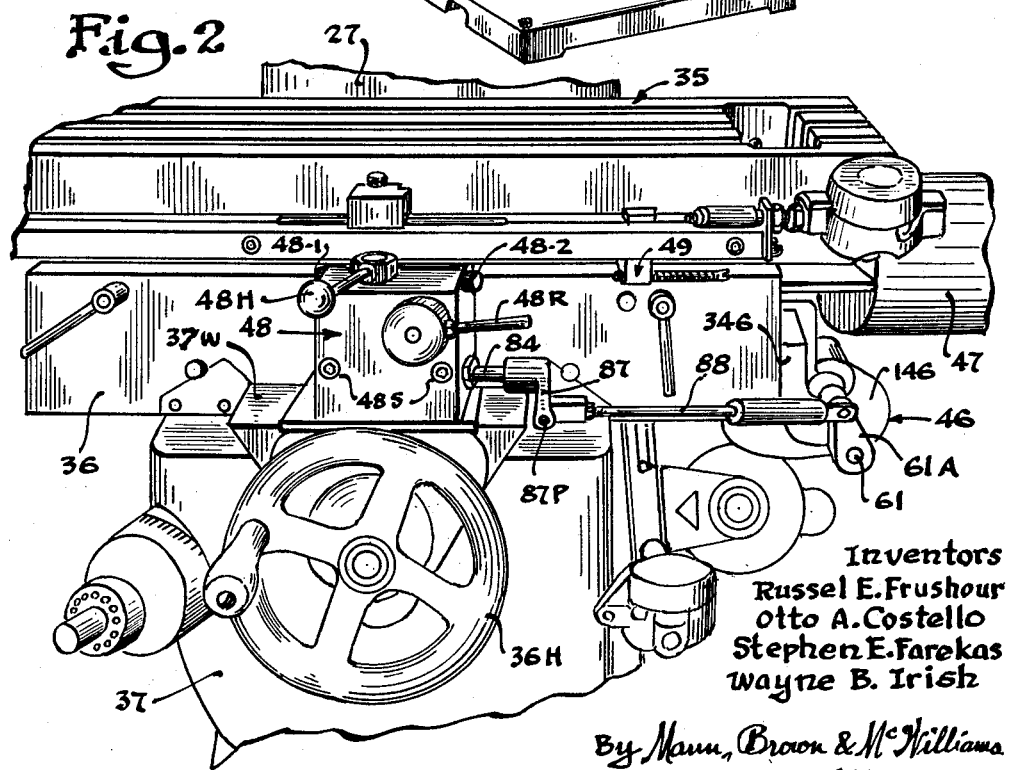
Figure 3:
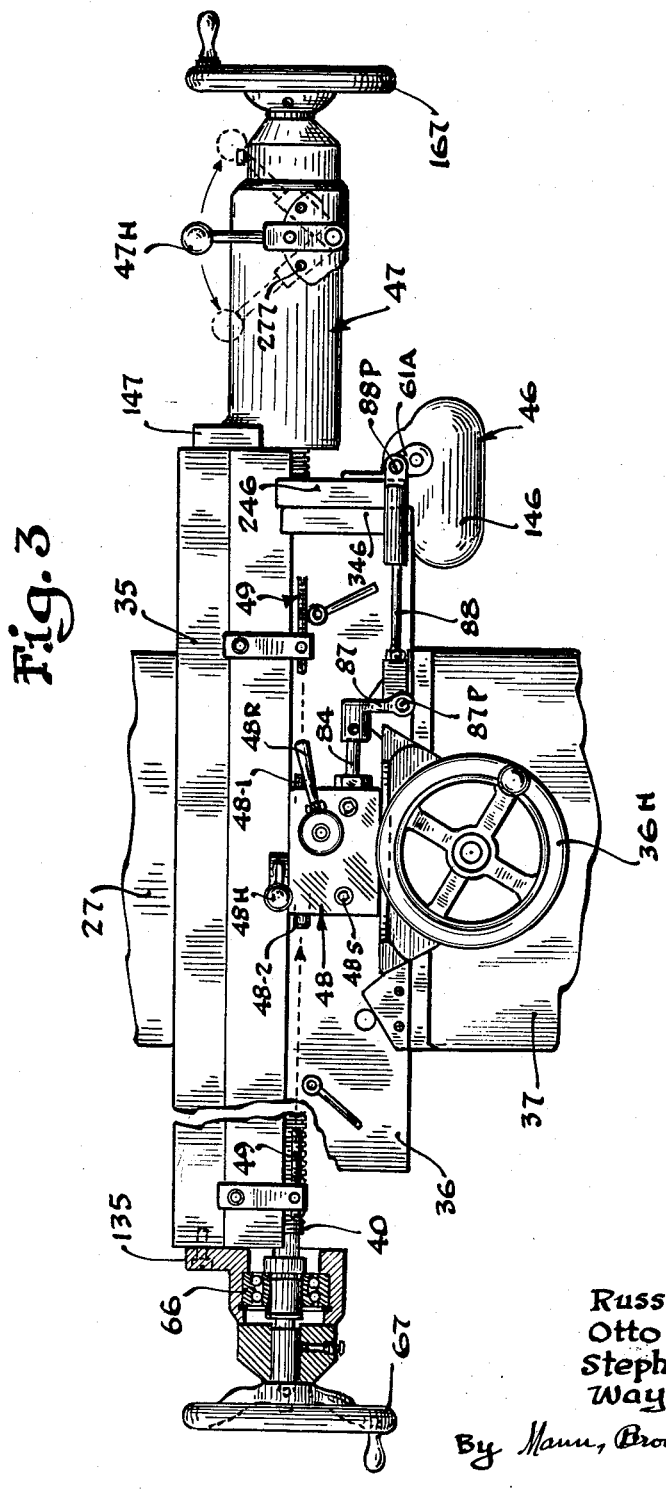

In the drawings:
FIG. 1 is a right hand perspective view of a vertical milling machine embodying the mechanical power table drive of the present invention;
FIG. 2 is an enlarged front perspective of a portion of the machine tool table;
FIG. 3 is a front elevational view of the table and the related drive means;

FIG. 4 is a horizontal sectional view taken through the table and illustrating details of the drive;
FIG. 5 is a vertical sectional view taken substantially along the line 5—5 of FIG. 4;
FIG. 6 is an end elevational view of the table, the view being taken partially in vertical section to illustrate internal features of the drive mechanism;
FIG. 7 is a vertical sectional view taken substantially along the line 7—7 of FIG. 6;
FIG. 8 is a plan view, taken partially in section, and illustrating the start-stop clutch and the related safety stop mechanisms;
FIG. 9 is a schematic perpsective view illustrating the structure shown in FIG. 8; and
FIG. 10 is a fragmentary vertical sectional view of one of the latching plungers shown in FIGS. 8 and 9.

For purposes of disclosure the invention is herein illustrated as embodied in a vertical milling machine 25 having a rectangular base 26 with an upstanding column 27 located on the rear portion of the base 26. At its upper end the column 27 has a head 28 supported forwardly of the column by means of an adjustable ram 29 and the head 28 includes driving means whereby a spindle 30 in the head may be driven. Beneath the head 28, an elongated reciprocable work-supporting table 35 is carried on a saddle 36, and the saddle in turn is supported on an adjustable knee 37. The knee 37 is arranged in the usual manner for vartical adjustment along guideways 27W formed on the forward face of the column 27, and such adjustment is attained through the use of conventional adjusting means including an operating handle 37H.

The saddle 36 is arranged for adjustment toward and away from the front of the column and is guided in such adjustment by adjusting means including a handle a 36H in the form of a hand wheel disposed at the forward end of the knee 37. The table 35 is guided in its longitudinal movement across or along the top of saddle 36 by means including ways 36W as indicated in FIG. 6 of the drawings.

The actuation or movement of the table 35 longitudinally across the saddle 36 is accomplished by means including a table feed screw 40 that is rotatably mounted on the lower side of the table as will be described in some detail hereinafter, and the screw 40 engages a stationary nut 41 that is fixed to the top of the saddle 36, as will be evident particularly in FIGS. 4 and 6 of the drawings. It is by rotation of the screw 40 that the longitudinal movement of the table 35 is produced, and the mechanical power drive of the present invention is arranged to drive the screw 40 in one direction or the other to produce the desired movement of the table 35.

In providing the mechanical power drive under the present invention, such drive is made up in several units that are associated with each other and with the various elements of the machine to produce the desired drive and control for the drive. Thus, as will be evident in FIG. 1, the mechanical power drive comprises a power unit 45 mounted at the right side of the column 27 on the base 26, and this power drive is connected to a main feed clutch unit 46 that is supported on the right hand side of the saddle 36 beneath the right hand end of the table 35. The main feed clutch unit 46 has its power output operatively associated with a main reversing clutch unit 47 that is mounted on the right hand end of the table 35 and which includes a three position reversing control handle 47H. The main feed clutch unit 46 has the control element of the clutch thereof associated with a main clutch control unit 48 that is mounted on the forward face of the saddle 36, and the main clutch control unit 48 includes a main operating handle 48H whereby the clutch of the unit 46 may be engaged, a quick release handle 48R for releasing the related clutch quickly when the occasion arises, and a pair of release plungers 48-1 and 48-2 that are adapted to be operated, respectively, by table dogs 49 to release or disengage the feed clutch when the table 35 reaches one end or the other of the desired table stroke.

The drive unit 45 is made up of a drive motor 45M and a change-speed gear box 45C that are carried on a frame 45F supported on the column and the base at one side thereof. The motor 45M is belt-connected to the input of the change-speed gear box and the output thereof is connected through an overload release clutch 50 which has a universal joint connection 51 with one end of a telescoping drive shaft 52 that extends forwardly and connects with the main clutch unit 46. At its forward end, telescoped drive shaft 52 is connected by a universal joint 53, FIG. 6, to an input shaft 54 that is supported in bearings 54B in the lower housing 146 of the unit 46. Within the housing 146 the shaft 54 has a bevel pinion 55 that is meshed with a bevel gear 56 that is keyed to a transverse shaft 57, FIG. 7, mounted in the housing 146.

The gear 56 is disposed near one end of the shaft 57, and near its other end, the shaft 57 has a clutch sleeve 58 that is keyed to the shaft 57 and which has clutch teeth 58T formed on the left hand end thereof, as viewed in FIG. 7. The clutch member 58 is adapted to be moved back and forth between its released position as shown in FIG. 7 and an engaged position where the teeth 58T engage clutch teeth 59T formed on a gear 59 that is mounted loosely on the hub of the bevel gear 56 and adjacent or opposite one end of the clutch member 58. Thus, when the clutch member 58 is shifted to the left, the gear 59 is driven, and when it is thus driven, the rotation thereof is transmitted to an intermediate gear 60 that is mounted on a shaft 60S that is parallel to the shaft 57 and disposed upwardly thereof in an upper housing portion 246 of the unit 46. It is from the gear 60 that the table actuating screw 40 is driven, as will be described.

The unit 46, as above pointed out, constitutes a main feed clutch unit for the drive of the table 35, and the clutch member 58 is shifted between its engaged and disengaged positions by a control shaft 61 that is located above and transversely of the clutch member 58 so that the shaft 61 extends forwardly to a point just beyond the forward edge of the saddle 36. The shaft 61 is supported at its rear end in the housing section 146, and within the housing section, the shaft 61 has a clutch-operating gear 62, the gear teeth thereof being located in an intermediate portion of the member and the end portions of the member being in the nature of cylindrical bearing surfaces that ride in cooperating bearing surfaces in the housing section 146. Within the housing 146 the gear 62 has the teeth thereof meshed with the teeth of a circular rack 58R that is formed on the external surfaces of the clutch member 58 so that by rocking movement of the shaft 61, the clutch member 58 may be engaged and disengaged as desired.

The housing section 246 of course houses the gear 60 and is formed on a relatively long mounting plate 346 which may be secured to the end of the saddle 36 by cap screws 346C. Near its forward end, the mounting plate has a downwardly projecting cylindrical bearing 61B through which the forward end of the shaft 61 projects, and a bearing collar 61C is pinned rearwardly of the bearing 61B, while an operating arm 61A is pinned or otherwise secured to the forward end of the shaft for imparting the desired rocking movement to the shaft 61 as will be described.

It has been pointed out that the gear 60 acts in the drive of the table screw 40, and in accomplishing this, the gear 60 is drivingly connected to a horizontal drive shaft 140 that is mounted in the table parallel to the screw 40. The shaft 140 has a drive gear 160 slidably keyed thereto, as shown in FIGS. 6 and 7, the gear 160 being mounted in an upper portion of the housing section 246 and being meshed with the gear 60. The shaft 140 of course moves longitudinally with the table 35 as will be described hereinafter, while the gear 160 remains in the same location in the housing section 246, but the driving connection between the gear 160 and the table drive shaft 140 is maintained during such movement by the slidable splined or keyed connection between these elements.

The present power drive for the table is one which may be incorporated in machine tools of the kind which normally have a manual table actuating mechanism, and this incorporation of the present power drive may be accomplished with but minor changes or substitutions in the mounting of the screw 40 in the table. Thus, tables of the kind employed in such machine tools normally comprise a relatively large casting having the bottom portions thereof formed to provide the necessary portions of the ways 36W, and at the ends of this table casting, it is the practice to provide end plates in which the table actuating screw is mounted. Under the present invention, the left hand end of the table 35 may be provided with an end plate 135 that is in most respects the same as would be used for a manual table actuating arrangement, the only change necessary being the provision of a flanged bearing 65 in the end plate 135 to receive and support one end of the table drive shaft 140. The usual thrust bearing arrangement 66 for supporting the left hand end of the screw 40 may be used, and the left hand wheel 67 may be the same as employed where the usual manual table operation is used.

At the other end of the table 35, however, the usual end plate is not used, and a special end plate 147 is provided on which a hollow housing 247 is provided to afford the housing of the reverse control unit 47 of the machine tool. Thus the screw 40 that is used in the power table drive of the present invention is somewhat longer than that which is used for the conventional manual drive, and the right hand end thereof is formed without threads where it projects beyond the end plate 147 and into and through the housing 247. The right hand end of the screw 40, outside of the housing 247, has a hand wheel 167 thereon so that the hand wheels 167 and 67 may be utilized to manually adjust the longitudinal position of the table in the same manner as with the usual hand operated table drive.

The other and right hand end of the table drive shaft 40 is supported in the right hand end wall 247W of the housing 247 by means of a flanged sleeve bearing 165, and adjacent to the end wall 247W of the housing 247, the drive shaft 140 is drivingly connected to the drive screw 40 by means of a reversing clutch mechanism 70 that is governed and controlled by the reversing lever 47H.

In providing for the drive of the screw 40 from the drive shaft 140, a cluster gear 71 is keyed on the drive shaft 140 adjacent the right hand end thereof as viewed in FIG. 4, and this cluster gear has a forward drive pinion 71F at its left hand end and a reverse drive pinion 71R near its right hand end, the reverse pinion 71R being of a somewhat smaller pitch diameter than the forward drive pinion 71F. The reverse drive pinion 71R is meshed with a transmitting pinion 72, FIG. 5, that is mounted on a stub shaft 73 adjacent to the right hand end wall of the housing 247, and the transmitting pinion 72 is in turn meshed with a gear 74 that is loosely mounted on the screw 40 in a fixed longitudinal position as will be evident in FIG. 4, and the gears 74 and 75 are of course spaced a substantial distance from each other in a direction longitudinal of the screw 40. It is within this space that the clutch mechanism 70 is provided.

Thus, the clutch includes movable or shiftable clutch member 70C that is keyed to the screw 40 for movement longitudinally thereof, and the adjacent faces of the gear 75 and the clutch member 70C have forward driving clutch teeth 75T formed thereon, while the adjacent faces of the gear 74 for the other end of the clutch member 70C have reverse driving clutch teeth 74T formed thereon. The relationship is such that when the clutch member 70C is in its central or mid-position, both sets of clutch teeth are disengaged, while shifting movement of the clutch member to the left in FIG. 4 engages the forward driving clutch 75T, while movement of the clutch member to the right in FIG. 4 engages the reverse driving clutch teeth 74T. When the clutch member is in its intermediate position, the table driving screw 40 may be operated manually with the same ease and for the same purpose as the usual manual table operating means.

The clutch member 70C is shifted between its three positions by the operating handle 47H which is secured by means such as a set screw 77S to a clutch operating shaft 77 that extends rearwardly through the front wall of the housing 247 as shown in FIG. 5 of the drawings. A spring detent 177 in the handle 47H is adapted to be engaged with any one of three recesses 277 formed in a pad on the forward face of the housing, thereby maintaining the handle 47H in its forward position, its reverse position, or its neutral position. The shaft 77 has a pinion 78 secured thereto by a set screw 78S, the pinion 78 and the set screw being accessible through an opening in the bottom of the housing 247, and the pinion 78 is engaged with an annular rack 170C that is formed on the clutch member 70C, as will be evident in FIG. 4 of the drawings.

As hereinbefore pointed out, the main clutch member 58 is operated primarily under control of the handle 48H, and this handle 48H is mounted on top of the unit 48 which basically takes the form of a relatively large metal block 148 that is secured to the forward face of the saddle 36 by cap screws 48S that extend rearwardly through the block and into the saddle 36. The handle 48H is mounted on the extended upper end of a shaft 81, FIGS. 8 and 9, that is rotatably in the block 148, and within the block near the lower surface thereof a relatively large gear 82 is fixed on the shaft 81 in such a position that the teeth on the rear edge of the gear 82 are meshed with teeth of the annular rack 83 that is fixed on a horizontal clutch operating rod 84. The annular rack 83 and the clutch operating rod 84 are slidably disposed in a mounting bore 85 that is extended horizontally into the block 148 from the right hand side thereof, as viewed in FIGS. 8 and 9, and within the bore 85 an expansion coil spring 86 is disposed in surrounding relation to the rod 84 so that the left hand end of the spring acts against the end of rack 83 while the right hand end of the spring acts against a closure nut 85N that surrounds the rod 84 and is threaded into the bore 85. The clutch operating rod 84 is thus constantly urged to the left as viewed in FIGS. 8 and 9 and such left hand movement of the rod 84 is effective to move the clutch member 58 to its disengaged position. This result is attained through a connection linkage extended from the rod 84 to the end of the clutch operating arm 61A. Thus the outer end of the rod 84 has a head 87 fixed thereon so as to extend downwardly, and a rod 88 is pivoted at 87P to the head 87 and is extended horizontally from the pivot 87P to the right and is pivotally connected at 88P to the end of the arm 61A, as shown in FIG. 3 of the drawings.

With the arrangement thus provided, the clutch member 58 may be engaged by movement of the handle 48H to the rear in FIGS. 8 and 9, thus to impart clockwise movement to the gear 82, and under the present invention, the gear 82 is maintained in its clutch-engaging position by releasable latch means that may be released either by the safety release lever 48R or by actuation of either of the automatic control plungers 48-1 or 48-2. Also, the clutch-operating gear 82 is latched in its clutch releasing position during the actuation of either of the automatic control plungers 48-1 or 48-2 to prevent further travel of the table towards the control plungers, thus eliminating possible damage should an attempt be made to actuate the control handle 48H.

In accomplishing the latching action, the gear 82 has a pair of bores or sockets 89E and 89D formed therein for selective engagement by a pair of latching plungers 90E and 90D that are mounted on vertical axes in the block 148, as will be evident in FIGS. 8 and 9.

The plungers 90E and 90D are similarly mounted and one of these plungers is illustrated in detail in FIG. 10. Thus, with respect to the plunger 90D, such plunger is mounted on the lower end of a cylindrical carrier 91D that is mounted in turn for vertical movement in a guide bore 92D. The plunger 90D has a head 191D at its upper end, and this head is slidable in a bore 93D that is extended upwardly through the bottom of the plunger 91D. A sleeve nut 94D surrounds that portion of the plunger 90D that is below its head and is threaded into the bore 94D so as to guide the plunger 90D and limit its downward movement with respect to the carrier 91D. When the plunger 90D is in its lowermost position in its carrier, the lower end of the plunger 90D projects somewhat below the lower end of the carrier and may be engaged with the bore 89D to latch the gear 82 against rotation. A spring 95D located within the bore 93D urges the plunger toward its projecting position in which it is shown in FIG. 10. When the carrier 91D is moved downwardly, the plunger 90D ordinarily strikes the flat upper surface of the gear 82 so that the plunger assumes a retracted position, the lower end of the carrier 91D at this time being in engagement with the upper surface of the gear 82. Then when the gear 82 is rotated to bring the bore 89D into position beneath the plunger, the spring 95D urges the plunger downwardly to its latching position.

The two carriers 91D and 91E are interconnected for actuation in unison in opposite directions so that one of the latching plungers is rendered ineffective while the other is conditioned for latching operation when the related latching bore is moved into position beneath the conditioned plunger. Such actuating mechanism includes an elongated pinion 95 that is disposed in a bore 95B that is extended forwardly through the rear surface of the block 148, this bore 95B serving to support the pinion 95 for rotation and being intersected at the opposite sides with the vertical bores in which the carriers 91E and 91D are mounted. The forward end portion of the elongated pinion 95 is meshed at its opposite sides with annular racks that are formed on the upper end portions of the carriers. Thus, as viewed in FIG. 9, rotation of the pinion 95 in a clockwise direction serves to retract the carrier 91E and thus unlatch or release the plunger 90E while at the same time moving the carrier 91D downwardly so as to condition the plunger 90D for latching operation. This released and conditioned relationship of the two latching plungers is reversed by rotation of the pinion 95 in a counter clockwise direction.

It has been pointed out that the release of the feed clutch may be accomplished either by the handle 48R or by either of the plungers 48-1 or 48-2, and in accomplishing such operation, elongated pinions 96 and 97 are positioned in bores 96B and 97B that are extended forwardly from the rear surface of the block 148. The bores 95B and 96B at 97B have their axes located in a common horizontal plane, and these bores overlap so that the middle pinion 96 is meshed with the left hand pinion 95 and with the right hand pinion 97 as viewed in FIG. 9. The pinion 97 is mounted on a horizontal shaft 98 that extends through the pinion 97 and is pinned thereto at 98P at its forward end, and the shaft 98 has the handle 48R fixed thereon at its forward end so that the handle 48R extends to the right from the shaft in a generally horizontal direction. Thus, by moving the handle 48R downwardly, the pinion 97 is rotated in a clockwise direction, and through the intermediate pinion 96, this imparts similar clockwise rotation to the pinion 95. The plunger 90E is thus withdrawn upwardly to unlatch the gear 82, and the spring 86 then becomes effective to release the feed clutch, and at the same time the gear 82 and the handle 48H are rotated in a counterclockwise direction to the position shown in FIG. 9 whereupon the conditioned latching plunger 90D enters the bore 89D and latches the feed clutch in its disengaged relationship.

Upon release of the handle 48R, the pinion 95 is caused to rotate in a counterclockwise direction by the decompressing of the spring 101, which will be covered hereinafter. This releases the latching plunger 90D and conditions the latching plunger 90E for operation. When it is again desired to engage the feed clutch, the operator may then move the handle 48H rearwardly until the bore 89E moves into position beneath the conditioned latching plunger 90E. The feed clutch is thus engaged, and the latching plunger 90E becomes effective to retain the gear 82 in position, thus to hold the feed clutch engaged.

The control plungers 48–1 and 48–2 are also effective to release the latching plunger 90E, thus to permit the feed clutch to disengage. In accomplishing this, the two control plungers 48–1 and 48–2 are mounted in opposite ends of a horizontal bore 99 that is extended entirely through the block 148 near the rear face thereof, and this bore intersects the upper portions of the bores 95B, 96B and 97B. With this arrangement, circular racks 100 formed on the inner end portions of the plungers 48–1 and 48–2 may and do engage the pinions 95 and 96, respectively. In this respect it is noted that the pinion 97 is grooved at 97G as shown in FIGS. 8 and 9 so that there is no engagement between the rack 100 of the plunger 48–2 and the pinion 97. The adjacent ends of the plungers 48–1 and 48–2 have an expansive coil spring 101 acting therebetween, thus to tend to move the plungers 48–1 and 48–2 into their projected positions wherein they extend considerably beyond the opposite sides of the block 148, but such outward movement is limited by reason of the engagement of the racks 100 with respective pinions 95 and 96 and the rotation of these pinions in turn being limited by the range of movement of the carriers 91E and 91D.

Thus, if the plunger 48–2 is pressed inwardly, it acts to impart counter-clockwise rotation to the pinion 96 so that the pinion 95 will be rotated in a clockwise or releasing direction. The latching plunger 90E will thus be released and the feed clutch will be moved to its released relationship.

Similar clutch releasing operation results from actuation of the plunger 48–1 which is directly meshed with the pinion 95 so that the pinion will be operated in a clutch-releasing or clockwise direction. Thus the clutch may be released by actuation of either of the plungers 48–1 or 48–2 or by actuation of the safety release handle 48R.

From the foregoing description it will be apparent that the present invention provides a new and improved mechanical power drive for machine tool tables, and it will also be evident that the power drive of the present invention is afforded by a plurality of individual units that may be mounted in a distributed relationship on the machine tool in such a cooperating relation that the power drive for the table is rendered effective without changing the usual manual operation of the table.

It will also be evident that the present invention provides a mechanical power drive for machine tool tables wherein the weight distribution of the power drive elements is unusually advantageous, and in particular that the power drive of this invention may be incorporated in a machine tool without imposing undue eccentric load on the reciprocating table.

It will also be evident that the present invention provides a mechanical power drive for machine tool tables wherein a new and improved control unit serves to govern the feed clutch and to provide the desirable safety features in such control. The safety control of the present invention is simple in character and compact in form so that it may be mounted on the forward face of the saddle of a vertical milling machine in the space that is customarily available forwardly of the saddle. The safety control is such that a single clutch releasing element may be actuated either by the operator or by table dogs at the ends of the maximum table stroke, or at the end of a pre-set working stroke, and this is accomplished by means of a simple mechanical character so as to assure continued reliability of operation.

Thus, while we have illustrated and described a preferred embodiment of our invention, it is to be understood that changes and variations may be made by those skilled in the art without departing from the spirit and scope of the appending claims.

We claim:

1. In a machine tool having a support and an elongated table reciprocable longitudinally on the support, the improvement which comprises a feed screw and a parallel table drive shaft extended longitudinally of and beneath the table, a fixed nut on the support in threaded relation to the feed screw, hand wheels on the ends of the screw for manual operation thereof, means including a reversing clutch for connecting said drive shaft and screw, said clutch having a neutral position wherein said screw is free for manual operation, power drive means for said table drive shaft, and an output gear disposed in slidable keyed relation with respect to said table drive shaft.

2. In a machine tool, a support having an elongated table mounted for longitudinal reciprocation thereon, a drive shaft and a feed screw rotatably mounted in parallel relation beneath said table and extended longitudinally thereof, a nut fixed to said support and through which said feed screw is threaded, a means including a reversing clutch for driving said screw in one direction or the other from said drive shaft, a transmission gear housing mounted on one end of said support beneath said table and having a terminal gear therein in splined association with said drive shaft, an input shaft in said gear housing, means including a main feed clutch in said transmission housing for connecting said input shaft to said terminal gear, a control lever mounted on said support for engaging said main clutch, spring means urging said main clutch to disengaged relation, latch means on said support operable to latch said main clutch in its engaged relation, and means for releasing said latch means.

3. In a machine tool, a support having an elongated table mounted for longitudinal reciprocation thereon, an end housing connected to and extended from one end of the table, a drive shaft and a parallel feed screw extended beneath said table longitudinally thereof and into said end housing and journalled at their opposite ends in said housing and at the other end of the table, a nut fixed to said support and through which said feed screw is threaded, means in said end housing including a reversing clutch for driving said screw in one direction or the other from said drive shaft, a transmission gear housing mounted on one end of said support beneath said table and having a terminal gear mounted therein in splined association with said drive shaft, an input shaft in said gear housing, means including a main clutch in said transmission housing, a control lever mounted on said support and operatively connected to said main clutch for engaging the same, spring means urging said main clutch to disengaged position, latch means on said support operable to latch said main clutch in its engaged position, and means for releasing said latch means.

4. A machine tool having a support with a table reciprocable thereon and a mechanical power drive for the table including a reversing clutch and a feed clutch, the improvement which is characterized by the provision of a feed clutch control unit mounted on said support and including a connecting linkage extended to said feed clutch and spring means acting on said connecting linkage to normally urge said feed clutch to its disengaged relation, a clutch control handle on said control unit effective to shift said linkage in a clutch-engaging direction against the action of the said spring means, latch means for latching said linkage in its clutch-engaging position, a safety release handle on said unit for disengaging said latch means, and a pair of control plungers forming part of said unit and adapted to be engaged and actuated by dogs on said table, and means connecting said plungers to said latch means for releasing said latch means when either one of said plungers is actuated by a table dog.

5. A machine tool having a support with a table reciprocable thereon and a mechanical power drive for the table including a reversing clutch and a feed clutch, the improvement which is characterized by the provision of a feed clutch control unit mounted on said support and including a connecting linkage extended to said feed clutch and spring means acting on said connecting linkage to normally urge said feed clutch to its disengaged relation, a clutch control handle on said control unit effective to shift said linkage in a clutch-engaging direction against the action of said spring means, a first latch for latching said linkage in its clutch-engaging position, a second latch for latching said linkage in its clutch-disengaging position, a latch control means for rendering one or the other of said latches effective, safety release handle on said unit for operating said latch control means, and a pair of control plungers forming part of said unit and adapted to be engaged by dogs on said table, and means connecting said plungers to said latch control means for releasing said first latch and rendering said second latch effective when either one of said plungers is actuated by a table dog.

6. In a machine tool having a support and an elongated table reciprocable longitudinally on the support, the improvement which comprises a feed screw and a parallel table drive shaft extended longitudinally of and beneath the table, a fixed nut on the support in threaded relation to the feed screw, hand wheels on the ends of the screw for manual operation thereof, means including a reversing clutch for connecting said drive shaft and screw, said clutch having a neutral position wherein said screw is free for manual operation, a housing secured to said support and having an output gear therein disposed in slidable keyed relation with respect to said table drive shaft, a feed clutch in said housing having driving and driven clutch elements with said driven clutch element in general relation to said output gear for driving the same, one of said clutch elements being shiftable between engaged and disengaged relationships with the other clutch element, a control unit mounted on said support and having a clutch operating rod operatively connected to said shiftable clutch element for engaging and disengaging the feed clutch, a spring acting on said rod to disengage the feed clutch, a clutch operating lever operable to shift said rod to engage the feed clutch, a latch on said support for latching the rod in its clutch-engaging position, a pair of plungers mounted on said support for engagement by table dogs at the opposite ends of the table movement, and means operated by and upon operation of either of said plungers to release said latch.

7. In a machine tool having a support and an elongated table reciprocable longitudinally on the support, the improvement which comprises a feed screw and a parallel table drive shaft extended longitudinally of and beneath the table, a fixed nut on the support in threaded relation to the feed screw, means including a reversing clutch for connecting said drive shaft and screw, a housing secured to said support and having an output gear therein disposed in slidable keyed relation with respect to said table drive shaft, a feed clutch in said housing having driving and driven clutch elements with said driven clutch element in general relation to said output gear for driving the same, one of said clutch elements being shiftable between engaged and disengaged relationships with the other clutch element, a control unit mounted on said support and having a clutch operating rod operatively connected to said shiftable clutch element for engaging and disengaging the feed clutch, a spring acting on said rod to disengage the feed clutch, a clutch operating lever operable to shift said rod to engage the feed clutch, a latch on said support for latching the rod in its clutch-engaging position, a pair of plungers mounted on said support for engagement by table dogs at the opposite ends of the table movement, and means operated by and upon operation of either of said plungers to release said latch.

8. A feed clutch and drive transmission unit for a mechanical table drive, said unit comprising a housing having upper and lower sections and a mounting plate rigid therewith for mounting said unit on the side of a machine tool saddle, said lower housing section having a rotatable input shaft extended into its rear side, a clutch shaft in said lower housing driven by said input shaft and having a driving clutch element slidably keyed thereon and a driven clutch element rotatably mounted thereon, a series of transmission gears including a gear fixed to said driven clutch element and other gears forming a gear train mounted in said upper housing section with a terminal gear rotatably mounted in the uppermost portion of said upper housing for slidably keyed driving connection with a table drive shaft, a clutch control rock shaft mounted in said lower housing section and geared to said driving clutch member for shifting said clutch member between engaged and disengaged positions, said clutch control shaft extending from the forward side of said lower housing section and having a supporting bearing near its forward end connected rigidly to said mounting plate, and means at the forward end of said clutch control shaft for imparting rocking movement thereto.

9. In a machine tool table having spaced ways along its lower surface, a pair of end plates secured to opposite ends of said table, a table drive screw and a drive shaft disposed in parallel relation beneath said table and having corresponding ends thereof rotatably mounted in one of said end plates, the other of said end plates having an extension housing formed thereon so as to project a substantial distance beyond the adjacent end of said table, the other ends of said drive shaft and screw being rotatably mounted in the cross wall of said extension housing, a cluster gear on said drive shaft adjacent said cross wall of said extension housing, said cluster gear having drive pinions at opposite ends thereof and in substantially spaced relation to each other, a forward drive gear loosely mounted on said screw and meshed with one of said pinions, a reversing gear meshed with the other of said pinions and mounted on said cross wall, a reversing drive gear loosely mounted on said screw and meshed with said reversing gear, a reversing clutch member splined on said screw between said forward driving gear and said reverse driving gear, cooperating clutch teeth on adjacent faces of said clutch member and said forward driving gear for driving said screw in a forward direction when such teeth are engaged, reverse driving teeth on the adjacent ends of said clutch member, said reverse driving gear being effective when engaged to drive said screw in a reverse direction, and means on said extension housing for shifting said clutch member between a neutral position and either of its engaged positions.

10. In a machine of the class described having a table moveable toward an abutment; the combination of power means for so moving the table, a transmission connecting the power means to the table and comprising a clutch, actuating means connected to the clutch and moveable to a position whereat the clutch is engaged and to another position whereat the clutch is released, releaseable means for latching said actuating means in said other position, means for releasing said latching means, limit means moveable with the table, and means responsive to engagement of said limit means with said abutment for moving said actuating means to said other position thereof and for rendering said releasing means inoperative, said clutch being operatively connected to table drive means, said table drive means including a reversing clutch for reversing the direction of table motion.

11. In a machine of the class described having a table moveable toward an abutment; the combination of a power means for so moving the table, a change-speed gear box operatively connected to the output of said power means, an output shaft having one end thereof operatively connected to the output of said change-speed gear box, said output shaft having the other end thereof operatively connected to a feed clutch unit that includes driving and driven clutch members, drive means in said feed clutch unit operatively connecting said driven clutch member to a table drive shaft, actuating means connected to the clutch and moveable to a position wherein the clutch is engaged and another position wherein the clutch is released, means including a reversing clutch and table drive screw for operatively connecting said table drive shaft and said drive screw, said reversing clutch including a plurality of driving and driven reversing clutch members, reversing clutch actuating means connected to said reversing clutch and moveable to a first position wherein reversing clutch members are engageable to rotate said table drive screw in one direction, said reversing clutch actuating means being movable to a second position wherein reversing clutch members are engageable to rotate said table drive screw in the opposite direction, said reversing clutch actuating means having a neutral position wherein said driving and driven reversing clutch members are disengaged, manual operating means secured to said table drive screw for manual rotation thereof when said reversing clutch actuating means is in said neutral position, and means to convert rotational movement of said table drive shaft to longitudinal movement of the table.

12. In a feed clutch and drive transmission unit comprising a housing having a mounting means thereon, a power input shaft extending into said housing, a first driving gear, within said housing rigidly secured to said power input shaft for rotation therewith, a clutch shaft having the ends thereof pivotally secured to said housing, a second driving gear secured to said clutch shaft for rotation therewith, said second driving gear being meshed with said first driving gear for rotation therewith, a clutch sleeve keyed to said clutch shaft for rotation therewith, said clutch sleeve being adapted to move axially along said clutch shaft, a driven gear rotatably mounted on said clutch shaft, a drive shaft, a drive gear mounted on said drive shaft, keying means between said drive shaft and drive gear to secure said drive gear to said drive shaft for rotation therewith and to permit axial movement of said drive shaft with respect to said drive gear, said drive gear being operatively connected to said driven gear, mutually engageable clutch surfaces on said driven gear and said clutch sleeve, and a clutch control rock shaft operatively connected to said clutch sleeve to cause said mutually engageable clutch surfaces to move between engaged and disengaged positions.

13. In a machine of the class described having a table moveable toward an abutment; the combination of a power supply for so moving the table, a change-speed gear box having the input thereof operatively connected to said power supply, a drive shaft having one end thereof operatively connected to the output of said change-speed gear box, a main feed clutch unit including driving and driven clutch members, a power coupling means including a universal joint having one end thereof operatively connected to the other end of said drive shaft and a transmitting shaft operatively connecting said drive shaft with said driving clutch member through the other end of said universal joint, actuating means connected to said main feed clutch and moveable to a position whereat the clutch is engaged and to another position whereat the clutch is released, manually operated latching means for latching said actuating means in said engaged position, manually operated release means for unlatching said actuating means, adjustable limit means moveable with the table, and means responsive to engagement of said limit means with said abutment for moving said actuating means to said released position thereof and for rendering said manually operated release means inoperative, said table having a rotatable table drive screw and a table drive shaft mounted therein, said driven clutch member being operatively connected to said table drive shaft, means including a reversing clutch for driving said rotatable table drive screw from the table drive shaft, said reversing clutch including a plurality of driving and driven reversing clutch members, reversing clutch actuating means connected to said reversing clutch and moveable to a first position wherein reversing clutch members are engageable to rotate said table drive screw in one direction, said reversing clutch actuating means being moveable to a second position wherein reversing clutch members are engageable to rotate said table drive screw in the opposite direction, said reversing clutch actuating means having a neutral position wherein said driving and driven reversing clutch members are disengaged, a hand wheel secured to said table drive screw for manual rotation thereof when said reversing clutch actuating means is in said neutral position, and a fixed nut in threaded relation to the table drive screw, said fixed nut being attached to the table support.

References Cited in the file of this patent

UNITED STATES PATENTS

| | | |
|---|---|---|
| 1,193,726 | Snow | Aug. 8, 1916 |
| 1,194,529 | Marr | Aug. 15, 1916 |
| 1,761,121 | Graves et al. | June 3, 1930 |
| 2,053,580 | Racklyeft | Sept. 8, 1936 |
| 2,240,506 | Levesque et al. | May 6, 1941 |
| 2,473,596 | Le Blond et al. | June 21, 1949 |
| 2,560,149 | Armitage | July 10, 1951 |
| 2,690,097 | Hassman | Sept. 28, 1954 |
| 2,775,329 | Stelljes | Dec. 25, 1956 |

FOREIGN PATENTS

| | | |
|---|---|---|
| 132,210 | Australia | Apr. 21, 1949 |